(12) United States Patent
Herbst et al.

(10) Patent No.: US 7,271,966 B2
(45) Date of Patent: Sep. 18, 2007

(54) MICROSCOPE OBJECTIVE WITH AXIALLY ADJUSTABLE CORRECTION MOUNTS

(75) Inventors: Georg Herbst, Goettingen (DE); Heinz-Guenther Ozimek, Katlenburg-Lindau (DE); Ingo Fahlbusch, Goettingen (DE); Heinz-Hermann Henkel, Goettingen (DE); Klaus-Dieter Albrecht, Bovenden (DE)

(73) Assignee: Carl Zeiss Jena GmbH, Jena (DE)

( * ) Notice: Subject to any disclaimer, the term of this patent is extended or adjusted under 35 U.S.C. 154(b) by 28 days.

(21) Appl. No.: 11/022,443

(22) Filed: Dec. 22, 2004

(65) Prior Publication Data
US 2005/0168843 A1    Aug. 4, 2005

(30) Foreign Application Priority Data
Dec. 24, 2003   (DE) ................. 103 61 912

(51) Int. Cl.
*G02B 7/02* (2006.01)
(52) U.S. Cl. .............. 359/813; 359/379; 359/656; 359/822
(58) Field of Classification Search ............ 359/813
See application file for complete search history.

(56) References Cited

U.S. PATENT DOCUMENTS

| | | | |
|---|---|---|---|
| 3,549,230 A | 12/1970 | Kogaku | |
| 4,790,642 A * | 12/1988 | Bruning et al. | 359/503 |
| 4,993,815 A | 2/1991 | Yamazaki et al. | |
| 5,267,089 A * | 11/1993 | Yamamoto et al. | 359/822 |
| 6,288,838 B1 * | 9/2001 | Ito | 359/377 |
| 2003/0210460 A1 * | 11/2003 | Takahama | 359/391 |

FOREIGN PATENT DOCUMENTS

| | | |
|---|---|---|
| DE | 38 12 745 | 10/1989 |
| DE | 198 04 470 | 8/1999 |
| DE | 199 47 378 | 4/2000 |
| DE | 10209403 | 10/2003 |
| EP | 0 660 942 | 1/1995 |

* cited by examiner

*Primary Examiner*—Jessica Stultz
(74) *Attorney, Agent, or Firm*—Reed Smith LLP

(57) ABSTRACT

The invention is directed to a microscope objective with axially adjustable correction mounts and is applicable in connection with different cover slips and/or different immersion liquids and/or at different work temperatures. In the microscope objective according to the invention, helical springs which are uniformly distributed along the circumference and act in axial direction are fixed by a first ring which has pins in axial direction on which the helical springs are arranged. The pins engage in bore holes of a second ring. The bore holes are at least deep enough to ensure the required spring path. The two rings with the helical springs arranged therebetween on the pins form a spring retainer which ensures a movement of the parts without play and/or in a springing manner. In principle, the proposed solution can be substituted for all pressure springs in microscope objectives and other objectives and can overcome the disadvantages of using individual springs.

7 Claims, 5 Drawing Sheets

MICROSCOPE OBJECTIVE WITH AXIALLY ADJUSTABLE CORRECTION MOUNTS

CROSS-REFERENCE TO RELATED APPLICATION

This application claims priority of German Application No. 103 61 912.7, filed Dec. 24, 2003, the complete disclosure of which is hereby incorporated by reference.

BACKGROUND OF THE INVENTION a) Field of the Invention

The invention is directed to a microscope objective with axially adjustable correction mounts in which lenses or lens groups are arranged, particularly for live cell imaging and for cell culture and tissue culture research. The invention is applicable in microscope objectives in connection with different cover slips and/or different immersion liquids and/or at different work temperatures.

b) Description of the Related Art

With these kinds of axial adjustments of optical elements in objectives, different kinds of corrections can be carried out in order to enable microscopic examinations under various conditions with high quality and high lateral magnifications.

In microscope objectives, the axial adjustment of optical elements arranged in correction mounts in relation to stationary optical elements can be realized in different ways.

DE 38 12 745 C2 describes a microscope objective with an aperture of at least 0.5 and a device for adjusting to different cover slip thicknesses in which a second lens group is arranged so as to be linearly displaceable between a stationary first lens group and a stationary third lens group, an additional lens group being axially displaceable in the opposite direction relative to this second lens group. The movement strokes of these displaceable lens groups can differ. An individual actuating ring is provided for realizing the displacements of the corresponding lens groups. In this objective, the device for adjusting to different cover slip thicknesses is coupled with a device for refocusing the entire objective. The lens groups are displaced linearly in the course of the adjusting movement. This can be achieved, for example, by means of threads of different pitches or by means of cams which engage in corresponding grooves with a constant but different pitch in a rotatable intermediate ring of the lens mount.

Further, EP 0 660 942 B1 discloses a microscope objective with at least one correction mount in which the correction mount is axially displaceable and is rotatable around the optical axis of the objective. A pin which is movable on a cam groove of a mount support and which is fixedly connected at one end to the correction mount and engages at the other end in a rotatable ring is provided for axial displacement and simultaneous radial rotation of the mount. Two axially displaceable and simultaneously rotatable correction mounts are provided in an objective disclosed in this reference.

DE 199 47 378 A1 describes an adjusting mechanism for an objective which is provided with an axially movable optical element that is connected to the main mount, or barrel, by a sliding mount. A first linear drive is connected by actuating members to a second linear drive which generates the linear movement along the optical axis. The second linear drive is connected to the sliding mount.

In order to ensure that the parts can move relative to one another without play in known objectives of the kind mentioned above, a uniform pressure is exerted on the mechanical structural component parts by springs or spring elements. Due to the large number of moving parts and the resulting frictional resistances and weight forces, the required spring force is usually so large that it is scarcely possible to use a conventional helical spring. A helical spring of this kind cannot be integrated within the limited space of a microscope objective. Movability of the structural component parts that is as unrestricted as possible is another criterion for the design of the spring. Some of the structural component parts in the microscope objective are rotated when correcting for different cover slips. In so doing, an individual helical spring is subjected to twisting stress which has a negative impact on the movability of the rotatable structural component parts.

DE 198 04 470 C1 discloses a microscope objective with a plurality of lens group mounts, one of which is formed as a correction mount for adapting to different cover slip thicknesses and is displaceable axially along the optical axis of the objective for changing position relative to stationary lens mounts. The axial displacement of the correction mount is carried out by means of a guide pin running on cam rings by actuating a knurled ring that is rotatable around the optical axis. To prevent tilting of the correction mount and to ensure the most uniform possible spring force over a large adjusting range, this solution provides a plurality of radially distributed pressure springs. Sleeves are arranged around the pressure springs for the purpose of free axial movement. It is disadvantageous that every pressure spring is integrated in a sleeve for guiding in order to prevent the springs from buckling. This sleeve takes up extra space in the microscope objective. Nevertheless, since the pressure springs are not completely guided in the sleeve in the interest of ensuring the spring path, buckling can occur in the exposed area. In this construction, none of the contact surfaces of the individual springs may be subjected to a rotating movement because this would result in a buckling of the springs.

OBJECT AND SUMMARY OF THE INVENTION

It is the primary object of the present invention to provide a microscope objective with correction mounts which enables adjustments for purposes of compensating parameters which influence imaging quality while retaining a small structural length of the objective and in which optical imaging errors are minimized in that the parts move relative to one another without play.

In accordance with the invention, a microscope object comprises axially adjustable correction mounts for adapting to different parameters influencing the imaging quality, wherein the axial adjustment of the correction mounts relative to a stationary barrel is realized by an adjusting ring. The adjusting ring is arranged on the outer side of the barrel by a pin which is arranged in the respective correction mount, is directed radial to the optical axis of the objective and engages in through-openings of threaded rings. Spring elements are provided for moving the parts relative to one another without play. The objective particularly comprises at least three correction mounts which are adjustable in direction of the optical axis of the objective by at least one adjusting ring without an additional rotation around the optical axis of the objective.

An advantageous embodiment with a small structural length of the entire objective results when a main mount, or barrel, is fixedly connected to an inner cylindrical sleeve with axially oriented through-openings; axially adjustable correction mounts for receiving optical elements in the form of lenses and/or lens groups are mounted in the cylindrical sleeve and a radially directed bolt or screw projecting through an associated through-opening in the cylindrical sleeve is arranged at the outer side of the correction mounts, respectively; threaded rings are in an operative connection with a respective bolt, are provided with an external thread of the same or different pitch, are mounted on the cylindrical sleeve so as to be axially displaceable only, and engage in an internal thread of corresponding pitch of respective driver rings which are associated with the threaded rings and which are arranged in the barrel so as to be rotatable around the optical axis and are in an operative connection with at least one adjusting ring arranged on the outer side of the barrel and can be rotated with this at least one adjusting ring.

It is advantageous when the driver rings which are in an operative connection with an adjusting ring are fixedly connected to one another and are rotatable jointly by the adjusting ring around the optical axis.

In order to realize different axial adjustment paths of the individual correction mounts, it is advantageous when the driver rings associated with an adjusting ring have threads of identical or different pitch. Different correction conditions in the objective can be taken into account in this way.

Further, it is advantageous when spring elements are arranged between the driver rings and the associated threaded rings to eliminate play or lost motion in the thread.

Pressure springs or elements that can perform the function of a pressure spring can advantageously be used for this purpose.

It is further advantageous when a securing element serving to protect the object is connected to the front correction mount and is movable axially together with the latter.

In order to achieve a connection between a bolt and the associated threaded ring that is without play at all times, it is advantageous when the bolts engage without play in a bore hole which is formed by at least one springing web and which is open toward the edge of the respective associated threaded ring. The diameter of the bore hole is advantageously less than or equal to the diameter of the part of the respective bolt engaging in the bore hole of the threaded ring so that the bolt is always clamped in the bore hole.

A connection between the bolt and the associated threaded ring without play also results advantageously when a flexible intermediate member is provided between the bolt and the wall of the bore hole of the threaded ring.

The invention serves to realize an optical correction in a microscope objective by axial displacement of three or more optical elements by means of radially moving threaded rings with threads having the same or different pitch, that is, without using the usual cam rings and spiral grooves in individual rings.

Further, in addition to the optical corrections, different observation conditions can also be adapted to. This substantially facilitates work with different immersion media, e.g., glycerin or water, and also in different temperature ranges, e.g., at 23° C. or 37° C., as well as use of the microscope with different cover slips of various thickness and tolerance. Further, a small structural length on the order of 50 mm can be achieved with this objective. At a short working distance of about 0.18 mm, it is also possible to realize a reliable protection of the preparation or object in a simple manner.

In the following, the invention will be described more fully with reference to an embodiment example.

DESCRIPTION OF THE PREFERRED EMBODIMENTS

Figure 1:
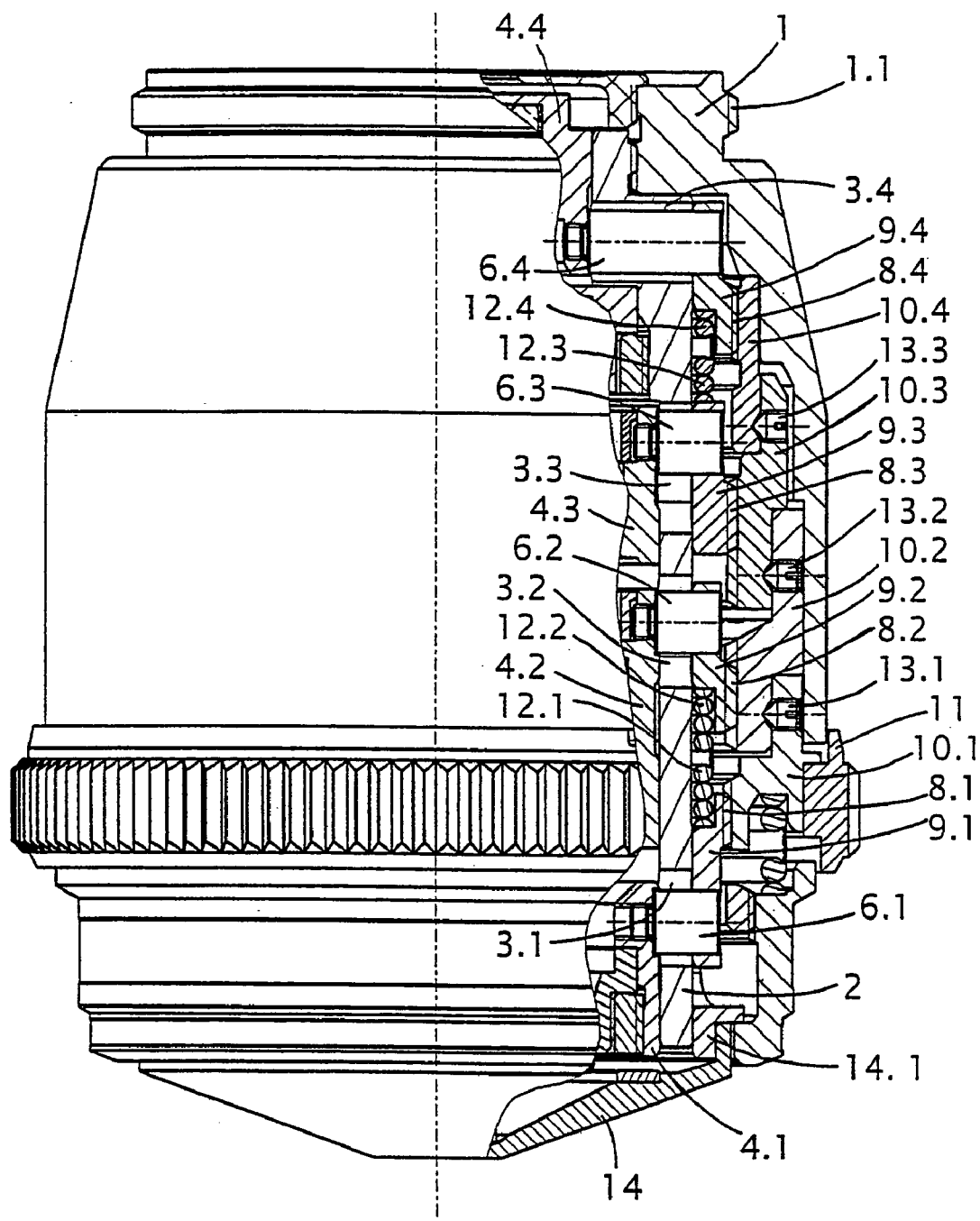
FIG. 1 shows a partial longitudinal section through a microscope objective according to the invention.

The microscope objective shown in partial section in FIG. 1 comprises a barrel 1 provided with a screw-in thread 1.1 and with an inner cylindrical sleeve 2 which is fixedly connected to the latter and which has axially directed through-openings 3.1 to 3.4 and in which precision, axially adjustable correction mounts 4.1 to 4.4 are arranged. In this embodiment example, four correction mounts 4.1 to 4.4 are provided. In principle, it is also conceivable to provide more than four, but at least three, correction mounts. Depending on the quantity of correction mounts provided in the objective, the cylindrical sleeve 2 also has a corresponding quantity of through-openings. The quantity of structural component parts cooperating with the correction mounts also depends on the quantity of correction mounts. The individual optical elements (not shown) comprising individual lenses and/or lens groups are fixedly held in these correction mounts 4.1 to 4.4. A radially directed bolt 6.1 to 6.4 which projects (engages) through an associated through-opening 3.1 to 3.4 of the cylindrical sleeve 2 or a screw is arranged at the outer side of the individual correction mounts 4.1 to 4.4 in each instance. One of these bolts 6.1 to 6.4 is in an operative connection with a threaded ring 9.1 to 9.4 associated with it. These threaded rings 9.1 to 9.4 each have an external thread 8.1 to 8.4 and are supported on the cylindrical sleeve 2 so as to be displaceable axially only. On the outer side, the threaded rings 9.1 to 9.4 are enclosed by driver rings 10.1 to 10.4 which are arranged in the barrel 1 and are provided in each instance with an internal thread of corresponding pitch. This internal thread is in an operative connection with the associated external threads 8.1 to 8.4 of the threaded rings 9.1 to 9.4.

The threaded rings 9.1 to 9.4 and the driving rings 10.1 to 10.4 can have threads of the same or different pitch, so that when the driver rings 10.1 to 10.4 rotate simultaneously around the optical axis 7 of the objective the threaded rings 9.1 to 9.4 which are fixed with respect to rotation relative to them carry out different displacements in direction of the optical axis 7.

The individual driver rings 10.1 to 10.4 are advantageously connected to one another by screws 13.1 to 13.3 or pins and are in an operative connection with at least one adjusting ring 11 which is actuated externally and is rotatable around the optical axis 7.

The microscope objective according to FIG. 1 is provided with an adjusting ring 11 by which the driver rings 10.1 to 10.4 can be displaced simultaneously and jointly by identical rotations. However, an objective (not shown) having a plurality of adjusting rings is also conceivable. In this case, one or more driving rings are associated with an adjusting ring and different axial displacements of the correction mounts with the optical elements mounted therein can be carried out with these driving rings.

On the object side, the objective has a securing element 14 which serves to protect the object or preparation and which is connected by an intermediate part 14.1 to the front correction mount 4.1 and is moved axially together with the latter.

The adjustment of the correction mounts 4.1 to 4.4 is realized in the following manner:

The correction mounts 4.1 to 4.4 in which the optical elements (not shown) are mounted and the threaded rings 9.1 to 9.4 having the external threads 8.1 to 8.4 are connected by bolts 6.1 to 6.4. These bolts 6.1 to 6.4 are guided through the axial through-openings 3.1 to 3.4 of the cylindrical sleeve 2 that is fixedly arranged in the barrel 1 and accordingly, together with the threaded rings 5.1 to 5.4 and the correction mounts 4.1 to 4.4, have only one possible adjustment or displacement in direction of the optical axis 7. A rotation around the axis 7 is not possible. The rotation of the adjusting ring 11 around optical axis 7 causes the driver rings 10.1 to 10.4 which are connected to one another to be rotated around the axis 7 along with it. An axial adjustment of the correction mounts 4.1 to 4.4 and of the optical elements mounted therein is realized through the rotation of the driver rings 10.1 to 10.4 by means of the adjusting ring 11 due to the cooperation of the internal thread of these driver rings with the corresponding external threads 8.1 to 8.4 of the threaded rings 9.1 to 9.4 which are arranged so as to be fixed with respect to rotation.

In order to eliminate the play or lost motion between the mutually engaging threads of the driver rings 10.1 to 10.4 and the associated threaded rings 9.1 to 9.4, spring elements 12.1 to 12.4 are provided. The threaded flanks of the threads of the respective threaded rings and driver rings which are in operative connection with one another are pressed against one another continuously by these spring elements 12.1 to 12.4.

The spring elements 12.1 to 12.4 shown in FIG. 1 correspond to those conventionally used in the art. In contrast, the other Figures show the spring elements according to the invention in detailed views and in their entirety.

Figure 2:
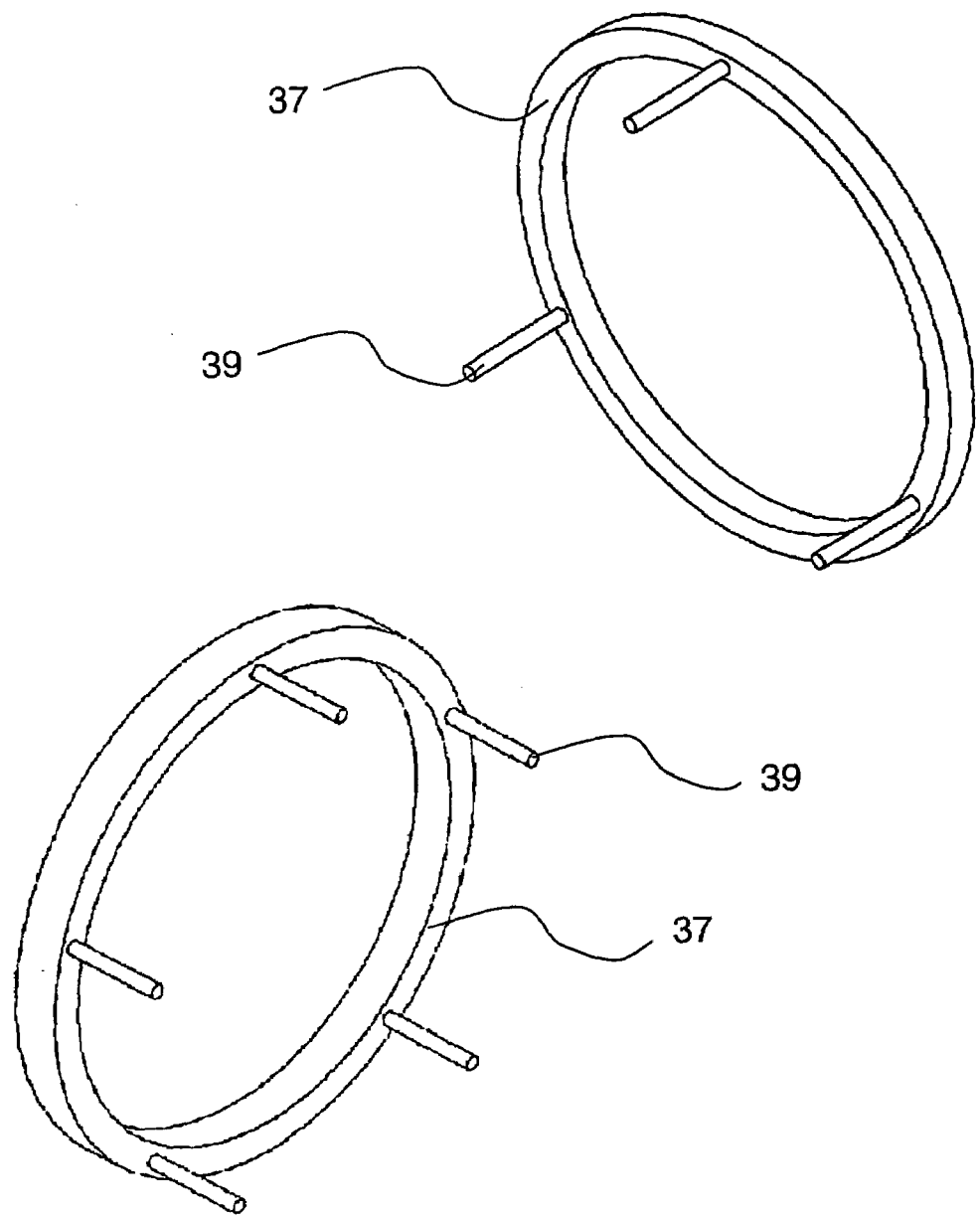
FIG. 2 shows two rings with different quantities of pins.

At least three helical springs 36 which are uniformly distributed around the circumference and act in axial direction are provided in each of the spring elements according to the invention. These helical spring 36 are fixed by a first ring 37 which has pins 39 in axial direction on which the helical springs 36 are arranged. FIG. 2 shows three rings 37 with different quantities of pins 39.

The quantity of pins 39 and of helical springs 36 depends on the spring force to be realized, this spring force being determined by the frictional resistances of the moving parts and their weight forces. The spring path to be realized can be varied by means of the length of the pins 39 and of the helical springs 36.

The pins 39 of the first ring 37 engage in bore holes 40 of a second ring 38. The bore holes 40 are at least deep enough to ensure the required spring path. The two rings 37 and 38, together with helical springs 36 arranged therebetween on the pins 39, form a spring retainer which can be arranged in each instance between the threaded rings 9.1 to 9.4 and the cylindrical sleeve 2 and ensures a movement of the parts without play.

Figure 3A:
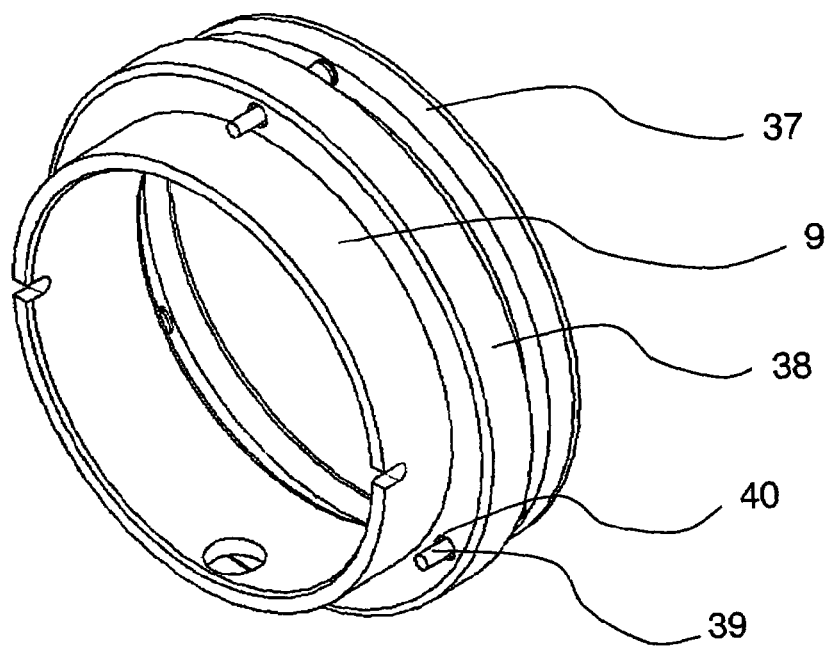
FIGS. 3a to 3b show different constructions of spring retainers.
Figure 3B:
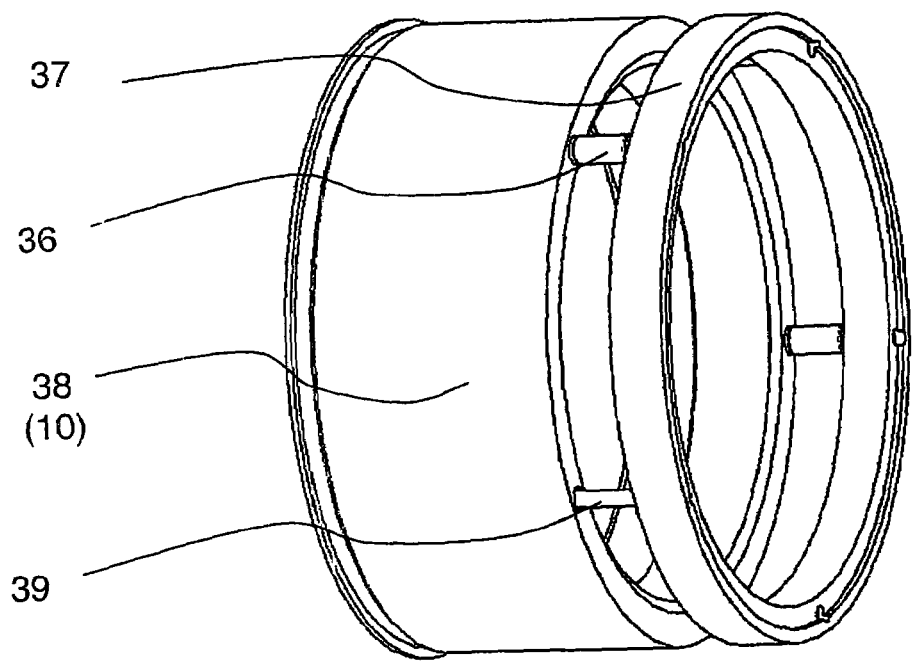

In an advantageous construction, at least one of the two rings 37 or 38 can be constructed as a threaded ring 9.1 to 9.4 (se FIG. 3a) or driver ring 10.1 to 10.4 (see FIG. 3b).

When the second ring 38 with the bore holes 40 receiving the pins 39 of the first ring 37 is fixedly connected to the barrel 1 or integrated therein, additional means for preventing rotation (screw-in thread 1.1) can be dispensed with.

Figure 4:
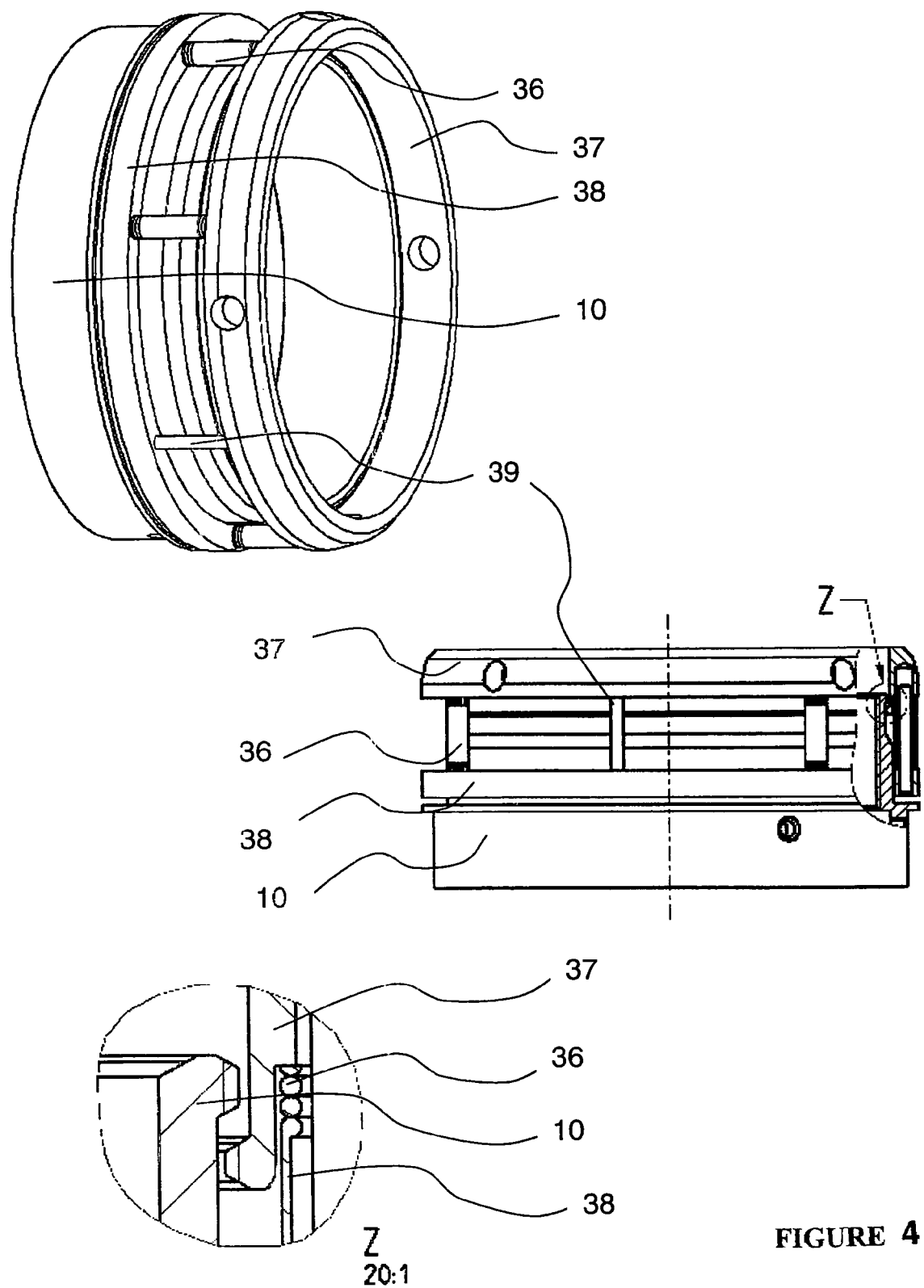
FIG. 4 shows a pre-produced, connected spring retainer in its entirety and details thereof.

In another advantageous construction, the spring retainer formed by the two rings 37 and 38 with the helical springs 36 which are arranged therebetween on pins 39 is a pre-produced, connected unit. FIG. 4 shows a complete view and details of a pre-produced, connected unit.

The ring 38 and a driver ring 10.1 to 10.4 receive a fine thread with the smallest possible pitch, e.g., M27×0.25.

The spring retainer 41, 42 is now assembled, i.e., the pins 39 are pressed into the bore holes of the ring 38 with the attached helical springs 36. The ring 38 is now screwed over the thread of the driver ring 10.1 to 10.4 and the spring retainer 41, 42 is assembled.

A spring retainer 41, 42 of this kind can also be mounted without difficulty in deep sleeves, for example. Further, a spring retainer 41, 42 of this kind can be completely rotated by 360°.

Figure 5:
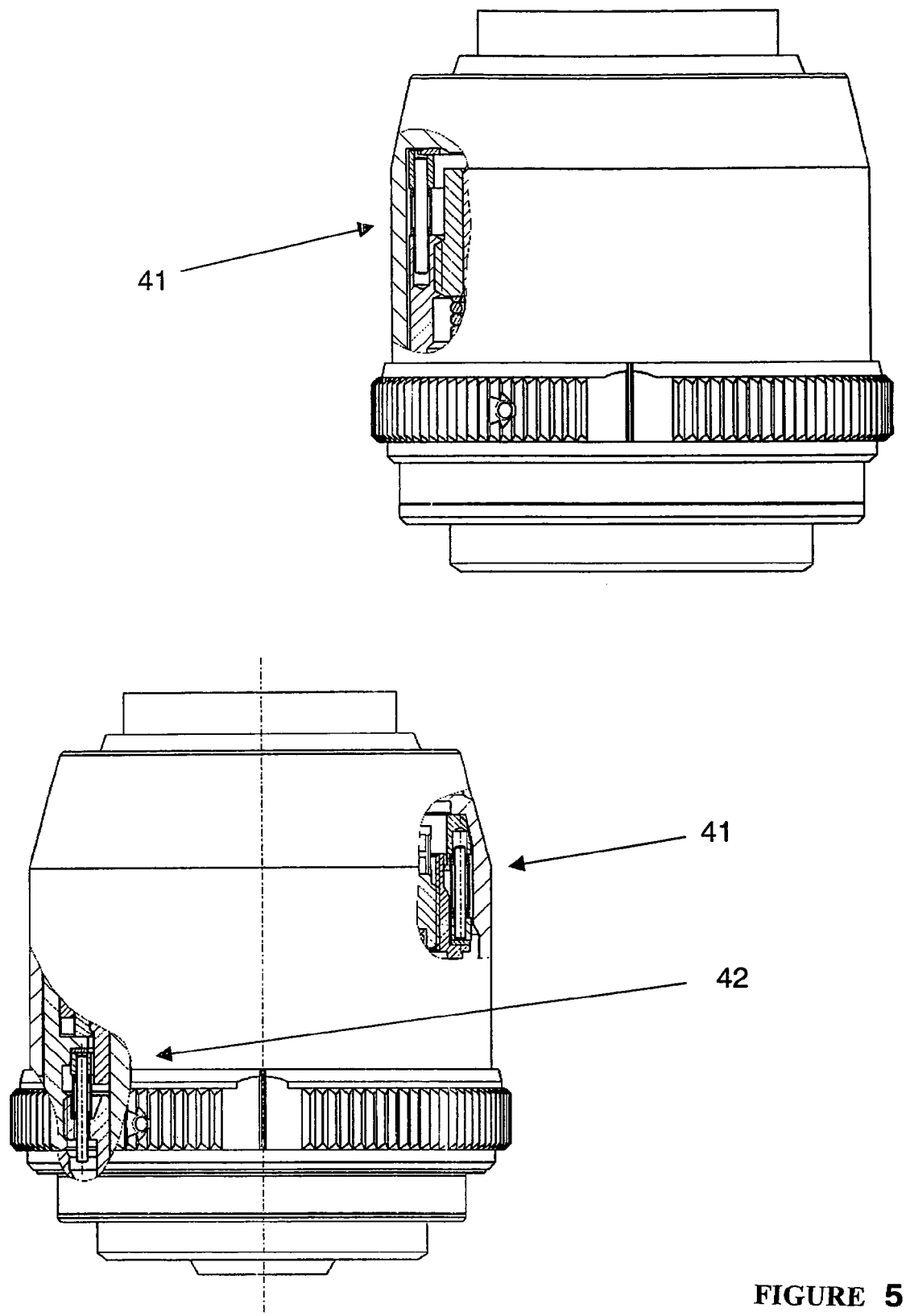
FIG. 5 shows partial longitudinal sections through two microscope objectives with spring retainers.

It can be seen from FIG. 5 that the spring retainers according to the invention can be used in various locations in the microscope objective. Different spring forces as well as different spring paths can be realized with the spring retainers. In this connection, the play of the rotatable structural component parts in the microscope objective in axial direction is eliminated. The spring retainer 42 compensates for the play of the adjusting threads that are responsible for the movement of the optical elements and likewise exerts a continuous, radial, uniform pressure on the structural component parts.

The proposed spring retainer can be adapted in a variable manner to the required spring force as well as to the spring path by means of the quantity and selection of the helical springs. Small spring paths, less than 1 mm, as well as long spring paths with a high variable spring force are possible. A large range of spring forces and spring paths can be covered by a small assortment of pressure springs.

Further, any quantities of the proposed spring retainer can be used in microscope objectives of any type in order to ensure movement of the parts without play and/or in a springing manner. A springing movement is required in particular when short working distances make it necessary for the optical elements mounted in a sleeve to be able to penetrate into the sleeve in case the user moves the objective onto the preparation or sample stage. This protects the microscope objective.

The solution proposed by the spring retainer according to the invention avoids the disadvantages in using individual pressure springs. In principle, the proposed spring retainers can be substituted for all pressure springs in other microscope objectives, even of dissimilar construction, and also other objectives in which there are problems relating to space. The assortment of pressure springs can be substantially reduced because of the variability of the spring retainer according to the invention.

The pressure distribution on the structural component parts in the microscope objective is optimized through the use of the spring retainer because a uniform distribution of pressure is ensured due to the fact that the individual helical springs are arranged so as to be uniformly distributed along the circumference. The optical characteristics as well as the mechanical characteristics of the microscope objectives can be substantially improved in this way.

While the foregoing description and drawings represent the present invention, it will be obvious to those skilled in the art that various changes may be made without departing from the true spirit and scope of the present invention.

| Reference Numbers | |
|---|---|
| 1 | barrel |
| 1.1 | screw-in thread |
| 2 | cylindrical sleeve |
| 3.1 to 3.4 | through-openings |
| 4.1 to 4.4 | correction mounts |
| 6.1 to 6.4 | bolts |
| 7 | optical axis |
| 8.1 to 8.4 | external threads |
| 9.1 to 9.4 | threaded rings |
| 10.1 to 10.4 | driver rings |
| 11 | adjusting ring |
| 12.1 to 12.4 | spring elements |
| 13.1 to 13.4 | screws |
| 14 | securing element |
| 14.1 | intermediate part |
| 36 | helical springs |
| 37 | ring |
| 38 | ring |
| 39 | pin |
| 40 | bore holes |
| 41 | spring retainer |
| 42 | spring retainer |

What is claimed is:

1. A microscope objective comprising:

axially adjustable correction mounts for adapting to different parameters influencing the imaging quality, wherein the axial adjustment of the correction mounts relative to a stationary barrel is realized by an adjusting ring;

said adjusting ring being arranged on the outer side of the barrel by a pin which is arranged in the respective correction mount, is directed radial to the optical axis of the objective and engages in through-openings of threaded rings;

spring elements being provided for moving the parts relative to one another without play;

wherein the objective comprises correction mounts, characterized in that the correction mounts are adjustable by at least one adjustment ring without any additional rotation around the optical axis of the objective, a barrel which is fixedly connected to an inner cylindrical sleeve with axially oriented through-openings, axially adjustable correction mounts for receiving optical elements which are mounted in the cylindrical sleeve, and a radially directed bolt or screw projecting through an associated through-opening of the cylindrical sleeve is arranged at the outer side of the correction mounts, respectively, wherein threaded rings are in an operative connection with a respective bolt, are provided with an external thread having the same or different pitch, are mounted on the cylindrical sleeve so as to be axially displaceable only, and engage in an internal thread of corresponding pitch of respective driver rings which are associated with the threaded rings and which are arranged in the barrel so as to be rotatable around the optical axis and are in an operative connection with at least one adjusting ring arranged on the outer side of the barrel and can be rotated with this at least one adjusting ring.

2. The microscope objective according to claim 1, wherein at least three helical springs which are uniformly distributed along a circumference of the mount and act in an axial direction, are provided as spring elements.

3. The microscope objective according to claim 1, wherein the helical springs, which are uniformly distributed along a circumference of the mount and act in an axial direction, are fixed by a first ring which has pins in axial direction on which the helical springs are arranged, the pins engage in bore holes of a second ring, wherein the bore holes are at least deep enough to ensure the required spring path, the two rings, together with helical springs arranged therebetween on the pins, form a spring retainer which is arranged in each instance between the threaded rings and a cylindrical sleeve and ensures a movement of the parts without play or in a springing manner, or both.

4. The microscope objective according to claim 1, wherein at least one of the rings forming the spring retainer, with helical springs arranged on the pins, can be constructed as a threaded ring or driver ring.

5. The microscope objective according to claim 1, wherein the second ring with the bore holes for receiving the pins of the adjusting ring is fixedly connected to the barrel or is integrated in the barrel.

6. The microscope objective according to claim 1, wherein the spring retainer, which is formed by two rings with helical springs arranged on pins, is a pre-produced, connected unit.

7. The microscope objective according to claim 1, wherein one or more spring retainers, which are formed by rings with the helical springs arranged on pins, are used in order to ensure a movement of the parts without play and/or in a springing manner, or both.

* * * * *